United States Patent [19]

Müller et al.

[11] Patent Number: 4,648,994

[45] Date of Patent: Mar. 10, 1987

[54] PROCESS FOR THE PREPARATION OF 1-AMINO-2-BROMO-4-HYDROXYAN-THRAQUINONE

[75] Inventors: Rolf Müller, Aesch; Hans Niederer, Binningen; Othmar Hahn, Basel, all of Switzerland

[73] Assignee: Ciba-Geigy Corporation, Ardsley, N.Y.

[21] Appl. No.: 822,178

[22] Filed: Jan. 24, 1986

[30] Foreign Application Priority Data

Feb. 4, 1985 [CH] Switzerland ............................ 492/85

[51] Int. Cl.$^4$ ............................................ C07C 97/26
[52] U.S. Cl. ...................................................... 260/380
[58] Field of Search ........................................ 260/380

[56] References Cited

U.S. PATENT DOCUMENTS

| | | | |
|---|---|---|---|
| 2,368,682 | 2/1945 | Seymour et al. | 260/380 |
| 2,604,480 | 7/1952 | Seymour et al. | 260/380 |
| 4,197,250 | 4/1980 | Redeker et al. | 260/380 |
| 4,235,789 | 11/1980 | Stout | 260/380 |
| 4,292,247 | 9/1981 | Mishikuri et al. | 260/380 |

FOREIGN PATENT DOCUMENTS

| | | | |
|---|---|---|---|
| 2817890 | 10/1978 | Fed. Rep. of Germany | 260/380 |
| 0160162 | 11/1985 | European Pat. Off. | 260/380 |

OTHER PUBLICATIONS

Ullmanns Encyklopädie der Technischen Chemie, 4th edition, vol. 7, (1974).
Houben-Weyl, vol. VII/3c (1979).

*Primary Examiner*—Glennon H. Hollrah
*Assistant Examiner*—Raymond Covington
*Attorney, Agent, or Firm*—Kevin T. Mansfield

[57] ABSTRACT

The invention discloses a process for the preparation of 1-amino-2-bromo-4-hydroxyanthraquinone by brominating 1-aminoanthraquinone in the 2- and 4-position in concentrated sulfuric acid and subsequently hydrolyzing the 1-amino-2,4-dibromoanthraquinone obtained as intermediate, which process comprises removing excess bromine and/or hydrobromic acid formed during the bromination from the reaction mixture and carrying out the hydrolysis at elevated temperature in the presence of an aldehyde. 1-Amino-2-bromo-4-hydroxyanthraquinone is an important intermediate for dyestuff synthesis and is used in particular for synthesizing anthraquinoid disperse dyes.

8 Claims, No Drawings

PROCESS FOR THE PREPARATION OF 1-AMINO-2-BROMO-4-HYDROXYANTHRAQUINONE

The present invention relates to a process for the preparation of 1-amino-2-bromo-4-hydroxyanthraquinone by bromination of 1-aminoanthraquinone in the 2,4-position and subsequent hydrolysis.

1-Amino-2-bromo-4-hydroxyanthraquinone is an important dyestuff intermediate. The compound can be prepared by various methods, e.g. starting from 1-amino-2,4-dibromoanthraquinone and replacing the halogen atom in the para-position by the hydroxyl group by hydrolysis with sulfuric acid in the presence of boric acid, or by bromination of 1-amino-4-hydroxyanthraquinone, in which process a bromination of positions of the anthraquinone structure other than the 2-position must be avoided by carefully maintaining the reaction conditions. An outline will be found in Houben-Weyl, Vol. VII/3c (1979), p. 203 et seq.

Further, German Offenlegungsschrift No. 28 17 890 discloses a one-vessel process and starting from 1-aminoanthraquinone, which is first converted by bromination into 1-amino-2,4-dibromoanthraquinone, which is in turn, without being isolated, reacted in sulfuric acid, in the presence of boric acid, to give 1-amino-2-bromo-4-hydroxyanthraquinone. The process is simple to perform and affords the desired product in good yield. The shortcoming of this process is, however, that the mixture of dilute sulfuric acid and boric acid formed during working up cannot be easily regenerated. For example, glassy residues are obtained and it is often necessary to neutralise the waste sulfuric acid, e.g. with calcium carbonate or slaked lime. In addition, the 1-amino-2-bromo-4-hydroxyanthraquinone obtained by this process is contaminated by compounds that are brominated in the 3-position. Such impurities result in changes in shade during the dye synthesis, i.e. standard shade dyes are not obtained.

Hence it is the object of the present invention to provide a process for the preparation of 1-amino-2-bromo-4-hydroxyanthraquinone that yields a substantially pure product and makes possible a smooth regeneration and thus recyclng of the sulfuric acid.

It has now been found that the hydrolysis of 1-amino-2,4-dibromoanthraquinone can also be carried out in the presence of an aldehyde, instead of with boric acid, with equally good results. The great advantage of this process is that the aldehyde-containing sulfuric acid can be regenerated without difficulty after working up. There is no formation of waste sulfuric acid that causes disposal problems. In addition, it has been found that, when carrying out this reaction as a one-vessel process without isolation of the intermediate, using 1-aminoanthraquinone as starting material, the formation of perbrominated by-products can be effectively prevented by removing excess bromine or the hydrobromic acid formed in the course of the reaction from the reaction mixture.

Accordingly, the present invention relates to a process for the preparation of 1-amino-2-bromo-4-hydroxyanthraquinone by first brominating 1-aminoanthraquinone in the 2,4-position, using sulfuric acid as reaction medium, and subsequently hydrolysing the bromination product without isolating it, which process comprises removing excess bromine and/or the hydrobromic acid formed during the bromination from the reaction mixture and carrying out the subsequent hydrolysis in the presence of an aldehyde.

The starting 1-aminoanthraquinone has long been known and can be obtained by different methods, for example starting from 1-haloanthraquinone- or 1-nitroanthraquinone and replacing the halogen atom or the nitro group by the amino group, or by reducing the nitro group to the amino group [q.v. Ullmann, Encyklopädie der technischen Chemie, 4th edition, Vol. 7 (1974), p. 590 et seq.].

The bromination of 1-aminoanthraquinone is conveniently carried out in sulfuric acid having a concentration of 80 to 100% by weight, preferably of 90 to 98% by weight. The dibromination can also be carried out in sulfuric acid of lower concentration; but before the hydrolysis, the concentration of the sulfuric acid should be increased to over 90% by weight, for example by adding oleum or introducing sulfur trioxide.

Sulfuric acid concentrations above 98% must be avoided in the bromination, as otherwise a slowing down of the reaction rate will result and by-products will form.

The amount of sulfuric acid employed will conveniently be 3 to 5 times the amount of weight of 1-aminoanthraquinone. It is preferred to use 4 to 6 parts of concentrated sulfuric acid to 1 part of aminoanthraquinone.

The preferred brominating agent is bromine, hydrogen bromide or an alkali metal bromide. It is most preferred to use elemental bromine. The bromine is conveniently employed in an amount of 1 to 3 moles per mole of 1-aminoanthraquinone.

The reaction temperature of the dibromination will depend on the particular concentration of the sulfuric acid employed as reaction medium, as bromination can be carried out at low temperature with increasing concentration of the sulfuric acid. It is expedient to carry out the bromination in the temperature range from 50° to 120° C. If the bromination is carried out in sulfuric acid having a concentration of c. 95% by weight, then good results are obtained at a reaction temperature in the range of 100° C.

The reaction time will depend on the concentration of the sulfuric acid and on the reaction temperature, and is normally from 8 to 15 hours. The bromination can be carried out in the presence of a conventional bromination catalyst. For example, small amounts of iodine, potassium iodide or zinc chloride may be added to the reaction mixture. An organic solvent may also be added to the sulfuric acid, e.g. acetic acid, propionic acid or nitrobenzene. The addition of such auxiliaries increases the solubility of the bromine in the sulfuric acid.

The essential feature of the process of this invention is that, upon completion of the bromination, i.e. before carrying out the hydrolysis, any excess bromine as well as the hydrobromic acid formed during the bromination and/or hydrolysis is substantially removed from the reaction mixture. This measure makes it possible to prevent almost completely the formation of perbrominated by-products. To remove the bromine and/or hydrogen bromide, it is expedient to blanket the reaction mixture with an inert gas, e.g. nitrogen. Further, the bromine and hydrobromic acid may also be removed by distillation.

The reaction mixture is subsequently subjected to hydrolysis. To this end the concentration of the sulfuric acid is, if necessary, increased to between 95 and 100% by weight. Then an aldehyde is added, advantageously in an amount of 0.5 to 3 moles, preferably from 0.5 to 1.5 moles, based on 1 mole of 1-aminoanthraquinone.

Aldehydes suitable for use in the process of this invention are aliphatic as well as aromatic aldehydes. It is preferred to use aliphatic aldehydes which, as monomers, contain 1 to 4 carbon atoms in the chain. Such aldehydes are, in particular, formaldehyde or formaldehyde donors, e.g. hexamethylenetetramine or dimethylol ethyleneurea. Formaldehyde may, of course, also be used in its polymerised form as paraformaldehyde.

Good results are also obtained with acetaldehyde, which may also be used in polymerised form, e.g. as paraldehyde or metaldehyde. Also suitable are propionaldehyde, n-butyraldehyde and isobutyraldehyde.

Particularly suitable aromatic aldehydes are benzaldehyde and p-chlorobenzaldehyde.

The hydrolysis is advantageously carried out in the temperature range from 80° to 130° C., preferably from 100° to 120° C. It is expedient to carry out the process in an inert gas atmosphere so as to prevent as far as possible the formation of by-products. This is achieved by passing a weak stream of nitrogen continuously through the reactor. The hydrolysis is usually complete after a reaction time of 1 to 10 hours. The reaction mixture is cooled to room temperature and working up is effected by one of the conventional methods. Usually the reaction mixture is diluted with water to precipitate the 1-amino-2-bromo-4-hydroxyanthraquinone almost completely in crystalline form. The precipitate is then isolated from the dilute sulfuric acid by conventional separating methods, e.g. by filtration or centrifugation, and washed if desired, and dried. The sulfuric acid can thereafter be concentrated once more and is available for a further batch.

1-Amino-2-bromo-4-hydroxyanthraquinone is the starting material for synthesising dyes belonging to a very wide range of classes, in particular anthraquinoid disperse dyes.

The invention is illustrated by the following Examnples, in which parts and percentages are by weight.

EXAMPLE 1

580 parts of 95% sulfuric acid and 0.5 part of iodine powder are charged to a stirred reactor, and then 111.5 parts of 1-aminoanthraquinone are added at room temperature to the stirred charge. The mixture is heated to 100° C. and 120 parts of bromine are added over 12 hours and at the same temperature. Stirring is continued for 3 hours at 100° C. Excess bromine is then expelled with nitrogen. A sample is taken to determine the bromine content, which is 41.4% (41.9% of theory).

Hydrolysis is carried out by adding 195.3 parts of 66% oleum and 16 parts of paraformaldehyde to the reaction mixture and heating it to 110° C. The mixture is heated in a stream of nitrogen to 110° C. until the presence of 1-amino-2,4-dibromoanthraquinone can no longer be detected. The reaction time is from 1 to 2 hours. Upon completion of the reaction, the reaction mixture is cooled to room temperature and diluted with 523 parts of water. The precipitated crystals of 1-amino-2-bromo-4-hydroxyanthraquinone are isolated by filtration and washed with water until neutral, affording 149 parts of product, corresponding to a yield of 93.7%, based on 1-aminoanthraquinone. Melting point: 226°–228° C. (lit.: 231°–232° C.). According to elemental analysis, the bromine content is 25.0% (calculated: 25.2%).

EXAMPLE 2

580 parts of 93% sulfuric acid are charged to a stirred reactor and then 111.5 parts of 1-aminoanthraquinone are added at room temperature to the stirred charge. The mixture is heated to 110° C. and 145 parts of bromine are added over 8 hours at this temperature. The mixture is then stirred for 1 hour at 110° C. and the removal of excess bromine by distillation is commenced. A sample is taken to monitor the bromination. The content of 1-amino-2,4-dibromoanthraquinone is 96%; the bromine content is 43.5% (theory: 41.9%).

Hydrolysis is carried out by cooling the reaction mixture to room temperature, cautiously adding 273.3 parts of 66% oleum and 18.1 parts of paraformaldehyde, and heating the batch to 105° C. The mixture is kept at this temperature under nitrogen until the presence of 1-amino-2,4-dibromoanthraquinone can no longer be detected. The reaction time is 1–2 hours. Upon completion of the reaction, the reaction mixture is cooled to 60° C. and diluted with 737 parts of water at 60°–65° C., whereupon crystals of 1-amino-2-bromo-4-hydroxyanthraquinone precipitate. The resultant suspension is stirred for 1 hour at 60°–65° C. and then filtered at 60° C. The filter cake is washed with water until neutral, affording 146.2 parts of 93.5% 1-amino-2-bromo-4-hydroxyanthraquinone, corresponding to a yield of 92%, based on 1-aminoanthraquinone. Melting point: 225°–227° C. (lit.: 231°–232° C.) According to elemental analysis, the bromine content is 28.4% (calculated: 25.2%).

Comparably good results are obtained by using the same amount of benzaldehyde or 2-chlorobenzaldehyde instead of paraformaldehyde.

What is claimed is:

1. A process for the preparation of 1-amino-2-bromo-4-hydroxyanthraquinone which comprises brominating 1-aminoanthraquinone in the 2- and 4-position in concentrated sulfuric acid, removing excess bromine and/or hydrobromic acid formed during the bromination from the reaction mixture and carrying out the hydrolysis at elevated temperature in the presence of an aldehyde.

2. A process according to claim 1, which comprises removing excess bromine and/or hydrobromic acid from the reaction mixture by blowing in inert gas or by distillation.

3. A process according to claim 1, wherein the hydrolysis is carried out in the temperature range from 80°–130° C.

4. A process according to claim 3, wherein the hydrolysis is carried out in the temperature range from 100° C.–120° C.

5. A process according to claim 1, wherein the aldehyde is an aliphatic aldehyde which, as monomer, contains 1 to 4 carbon atoms in the chain.

6. A process according to claim 5, wherein the aldehyde is employed as monomer or polymer or in the form of a formaldehyde donor.

7. A process according to claim 1, wherein 0.5 to 3 moles of aldehyde are employed per 1 mole of 1-aminoanthraquinone.

8. A process according to claim 7, wherein 0.5 to 1.5 moles of aldehyde are employed per 1 mole of 1-aminoanthraquinone.

* * * * *